United States Patent [19]

Takano et al.

[11] 4,099,897
[45] Jul. 11, 1978

[54] APPARATUS FOR PRODUCING FOAMED PLASTIC INSULATED WIRES

[75] Inventors: Hideo Takano; Satoshi Saito; Tadashi Sato; Tuyoshi Yamaguchi; Yoshihiro Narita, all of Ibaragi, Japan

[73] Assignee: Hitachi Cable, Ltd., Tokyo, Japan

[21] Appl. No.: 628,625

[22] Filed: Nov. 4, 1975

[51] Int. Cl.² ................... B29D 27/00; B29G 7/02
[52] U.S. Cl. ................... 425/4 C; 425/208; 366/82
[58] Field of Search ............ 425/208, 817 C, 4 C; 259/191, 193

[56] References Cited

U.S. PATENT DOCUMENTS

| 2,453,088 | 11/1948 | Dulmage | 259/193 |
|---|---|---|---|
| 3,023,456 | 3/1962 | Palfey | 425/208 |
| 3,070,836 | 1/1963 | DeHaven et al. | 425/208 X |
| 3,248,469 | 4/1966 | Kosinsky et al. | 425/208 X |
| 3,287,477 | 11/1966 | Vesilind | 425/208 X |
| 3,652,064 | 3/1972 | Lehnen et al. | 425/208 X |
| 3,664,795 | 5/1972 | Heinz et al. | 425/208 |
| 3,751,015 | 8/1973 | Hensen et al. | 259/191 |
| 3,762,692 | 10/1973 | Schippers | 259/191 |
| 3,787,542 | 1/1974 | Gallagher et al. | 425/817 C |
| 3,788,614 | 1/1974 | Gregory | 259/191 |
| 3,941,535 | 3/1976 | Street | 425/208 |

Primary Examiner—Richard B. Lazarus
Attorney, Agent, or Firm—Sughrue, Rothwell, Mion, Zinn and Macpeak

[57] ABSTRACT

An extrusion apparatus and method for producing foamed resin coatings on a wire. A foaming agent and molten resin are poured into a supply portion of an extruding screw and cylinder apparatus. The screw in the supply portion is tapered in the down stream direction. The screw and cylinder apparatus portion adjacent to the supply portion is arranged to blend the resin and foaming agent and has a lower coefficient of extrusion than the supply portion. The metering portion of the screw and cylinder apparatus is adjacent and down stream of the blend portion and has a higher coefficient of extrusion than the blend portion.

14 Claims, 5 Drawing Figures

APPARATUS FOR PRODUCING FOAMED PLASTIC INSULATED WIRES

BACKGROUND OF THE INVENTION

This invention relates to a method and an apparatus embodying the method for producing electric wires (for example, such as insulated cores for communication cables) having an insulating layer of plastic foamed on the periphery of the conductor.

For prior art methods of producing foamed plastic insulated wires using an extruding machine, one method has been proposed wherein, for example, a foaming agent inlet is provided in a part of an extrusion cylinder or an extrusion screw in the metering portion of the cylinder. As is well known, the metering portion of an extrusion cylinder is that portion which stabilizes the temperature, pressure and volume of the resin so that a uniform amount of resin is extruded. This method, however, has the disadvantage that it is extremely difficult to mix the foaming agent into the thermoplastic resin. This is due to the fact that the resin pressure in the metering portion is very high (generally, in excess of 150 kg/cm²), and as is well known, the greater the pouring pressure of the foaming agent as compared to the resin pressure the greater will be the transmission coefficient (i.e., the degree of mixing).

In another example of a known method, a gaseous foaming agent is introduced into a breaker plate at the rear of the metering portion. In this case, also, it is difficult to dissolve the gas into the resin for the same reason noted above. Furthermore, in the latter case, the resin and gas are agitated by means of a screw type agitator in a cross head located upstream of the breaker plate portion to thereby greatly vary the extrusion pressure, with the result that it has been difficult to continuously obtain uniform foamed bodies.

A further method of obtaining a foamed body is carried out by directly admitting under pressure a foaming agent into an extruding machine and using a screw having a compression portion with a volume surrounded by one pitch reduced in the direction of extrusion, as in a slow compression type screw. This method possesses a disadvantage such that the poured foaming agent is difficult to mix or dissolve in the resin, and as a result, it is difficult to obtain uniform foamed bodies.

It is therefore an object of this invention to provide a method and an apparatus embodying said method for producing electric wires, while eliminating the various defects noted above, wherein a foaming agent may very easily be mixed and dissolved in a resin even if the pouring pressure of the foaming agent is low, and variation of extrusion pressure can be minimized.

SUMMARY OF THE INVENTION

In accordance with the present invention, an extruding apparatus consisting essentially of a cylinder and an extruding screw therein is arranged in three portions adjacent one another. The portions in the downstream direction are (1) the supply portion, (2) the blend portion, and (3) the metering portion. The molten resin and a foaming agent are introduced into the supply portion via separate inlets and are fed to the blend portion by a screw tapered in the downstream direction. The coefficient of extrusion of the blend portion is below that of the supply portion and is also below that of the metering portion. The mixed and compressed resin and foaming agent is fed to the metering portion which supplies a constant volume rate of flow at a constant pressure to the outlet of the cylinder and extruding screw apparatus.

DETAILED DESCRIPTION OF THE INVENTION

An embodiment of the method and apparatus according to the present invention will now be described in reference to the accompanying drawings.

Figure 1:
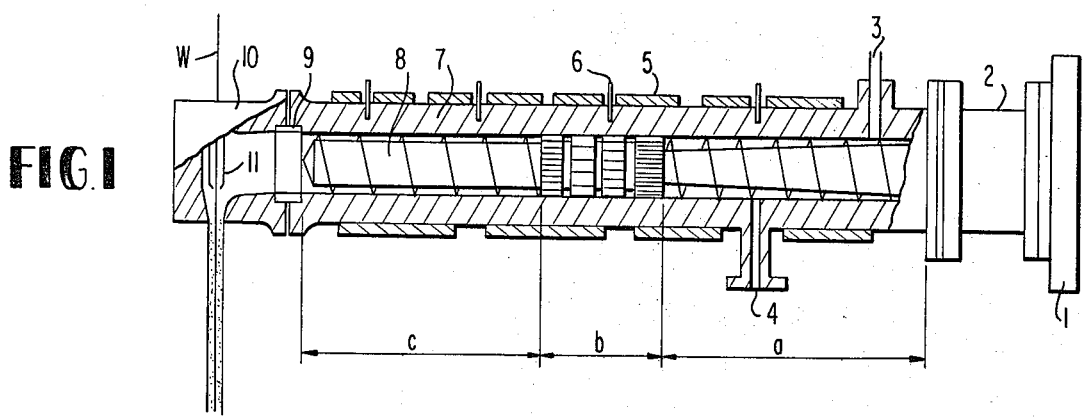
FIG. 1 is a cross-sectional view of one embodiment of an extruding apparatus according to the present invention.

FIG. 1 shows one embodiment of an extruding machine used in the method according to the present invention.

In FIG. 1, the reference character 2 denotes a device for sealing high pressure liquid and gas, 5 a heater, 6 a thermocouple, 7 a cylinder, 9 a breaker plate, 10 a cross head, 11 a nipple holder, and W an electric wire (conductor). There is also shown a foaming agent inlet 3, through which a foaming agent is admitted under pressure in the form of gas or liquid. On the other hand, molten polyethylene is admitted under pressure through a molten resin inlet 4, after which it is conveyed to a blend portion $b$ by means of an extrusion screw 8.

In the blend portion $b$ the molten polyethylene and foaming agent are sufficiently blended until the foaming agent is dissolved into the molten polyethylene. Thereafter, they are uniformly metered in a metering portion $c$ to render their temperature and pressure equal, and minute bubbles are instantly formed in the resin by the immediate reduction of pressure in the extrusion head portion. In this case, the distance $d$ from the foaming agent inlet 3 to the molten resin inlet 4 is between 2D and 7D (where, D is the caliber or diameter, of the screw) and the distance $e$ from the molten resin inlet 4 to the blend portion $b$ is between 2D and 5D. The length $b$ of the blend portion is between 2D and 7D. The reference character $a$ denotes a supply portion, the screw therein being configurated in the form of an inverted taper. The depth of the screw groove in the metering portion $c$ is constant or is deeper than that in the supply portion $a$. The relationship between the metering portion and supply portions are selected to meet the following conditions:

(1) the compression ratio varies between 1.4 to 0.75 (preferably, 1.3 to 0.95) where, $$\text{Compression ratio of Screw} = \frac{\text{Volume surrounded by one pitch in zone } c}{\text{Volume surrounded by one pitch in zone } a}$$

and, (2) A is 0.061 to 0.123 (preferably, 0.077 to 0.110) where, $$\text{A (effective depth of Screw groove)} = \frac{\text{Depth of screw groove}}{\text{Caliber of extrusion cylinder}}$$

Further, the relationship between the supply portion $a$, the blend portion $b$, and the metering portion $c$ should satisfy the conditions set forth below.

A simplified formula for the extrusion amount is: Extrusion Amount = $aN$; where, $a$ is the coefficient of extrusion, i.e., the volume extruded per revolution of the screw, and N is the number of revolutions of the screw. Assuming that the coefficient of extrusion is determined due to the difference of the screw contour in the respective zones, and that the coefficient of extrusion is, $\alpha_1$ in the supply portion $a$, $\alpha_2$ in the blend portion $b$, and $\alpha_3$ in the metering portion $c$, the relationship of $\alpha_1 > \alpha_2$ and $\alpha_3 > \alpha_2$ must be established. That is, $\alpha_1/\alpha_2$ is between 1.21 and 1.71 (preferably, 1.45 to 1.60), and $\alpha_3/\alpha_2$ is between 1.11 and 1.61 (preferably, 1.35 to 1.45).

The ratio between $\alpha_1$, $\alpha_2$ and $\alpha_3$ in a specific embodiment of the present invention is given by $$\alpha_2 : \alpha_3 : \alpha_1 = 1 : 1.42 : 1.52.$$

For the mixing device in the blend portion $b$, a Dulmage mixing device, as shown in FIG. 1, is employed. A Dulmage mixing device is composed of a plurality of grooves which have a helical angle to the downstream direction. The embodiment of FIG. 1 is the case of a helical angle being 0. Further description of a Dulmage mixing device is described in U.S. Pat. No. 2,453,088.

The insertion of the Dulmage screw facilitates the diffusion of the gaseous foaming agent into the resin. This is due to the fact that before the Dulmage section, the resin is separate from the gas, whereas in the Dulmage section, there is sufficient diffusion of gases into the resin. In the Dulmage section, the contact area between the resin and the gas is enlarged by mixing so as to increase the efficiency of diffusion.

Figure 2:
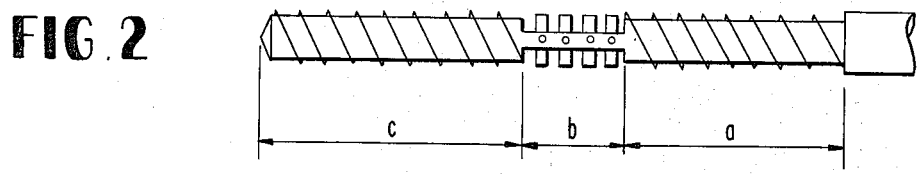
FIGS. 2, 3 and 4 illustrate other embodiments of a screw portion of an extruding apparatus according to the present invention.
Figure 3:
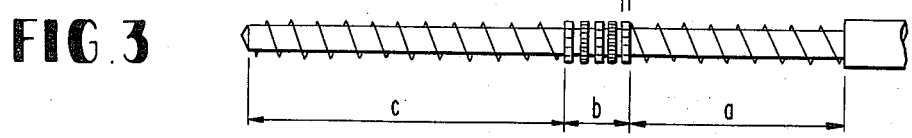
Figure 4:
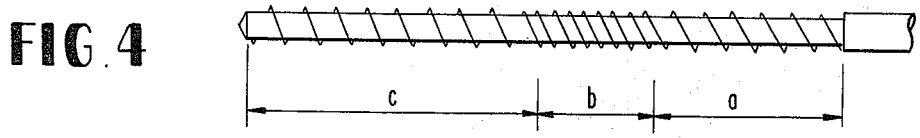

Several other types of blending means may be substituted for the Dulmage mixing device. Three such means are illustrated by the three screws shown in FIGS. 2-4, respectively. In the blend portion of FIG. 2, the screw shaft is reduced in diameter and a plurality of posts are implanted on the shaft. In the sample shown in FIG. 3, equally spaced spur gears having an identical thickness $h$ (e.g., 20 mm) are arranged on the shaft in the blend portion. Each gear has a different number of teeth than all other gears. In FIG. 4 the blend portion consists of double threading having a plurality of axial slots therein, such as screw tapes. This creates a shearing force between an advanced portion and a delayed portion of the molten resin moving along the thread.

Suitable foaming agents used in the present invention are aliphatic hydrocarbon having a low boiling point such as propane, butane, pentane and hexane; halogen hydrocarbon such as alcohol, monochlorodifurorome-thane, and dichlorotetrafuroethane, and inactive gases such as carbon dioxide, nitrogen or argon, and helium. The thermoplastic resin used in the present invention may be, for example, polypropylene, polystyrene, polyvinyl chloride, ethylene acetate - vinyl copolymer, ethylene - propylene copolymer, polyvinylidene chloride, vinyl chloride - ethylene copolymer, and polyacrylonitrile in addition to polyethylene.

Figure 5:
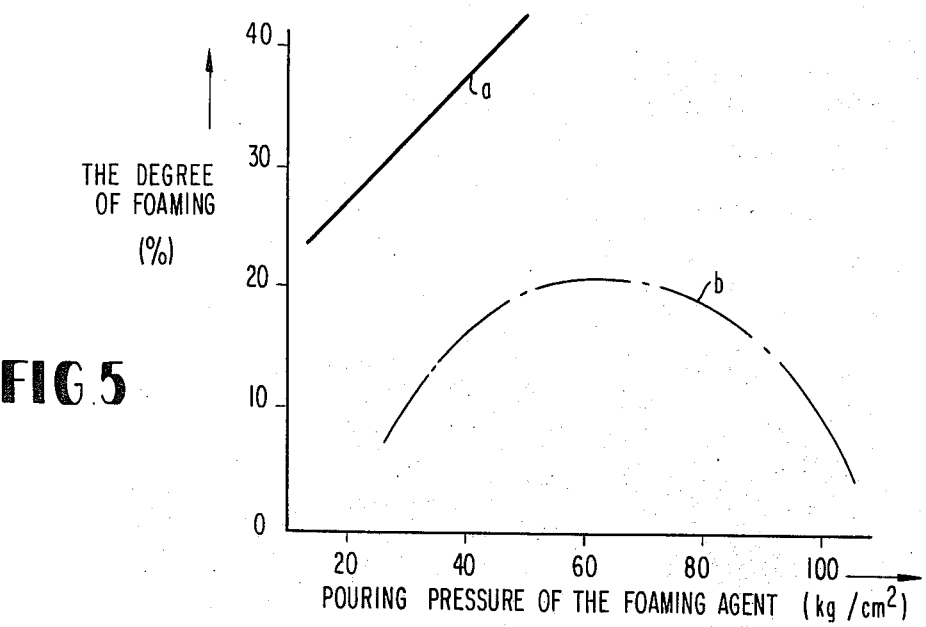
FIG. 5 is a diagram showing the comparison of the degree of foaming between the present invention and the prior art method.

FIG. 5 is a graphic representation illustrating the comparison of the degree of foaming between the conventional slow compression type extruding apparatus and the apparatus of the present invention, in which curve $a$ indicates that of the present invention while curve $b$ indicates that of the conventional type (the data here is based on an extruder with a caliber of 65 mm). In FIG. 5, the degree of foaming, expressed as a percent of theoretically complete foaming, is plotted on the ordinate, and the pouring pressure is plotted on the abscissa.

It should be understood from FIG. 5 that in the present invention, foaming easily takes place even if the pouring pressure of the foaming agent is low, that is, the foaming agent is very easily mixed and dissolved.

Furthermore, since the extrusion pressure is low, it is possible to maintain significant stabilization without entry of the foaming agent into the molten resin in the form of a void.

In addition, since the supply portion is in the form of an inverted taper, the foaming agent is very easily mixed and dissolved to minimize variation of extrusion pressure, thus enabling the production of thermoplastic foamed bodies with a better efficiency.

Further, since the coefficient of extrusion in the respective portions has been established in the relationship as previously mentioned, the stabilized extrusion of foamed insulated bodies can be carried out. Also, the relationship of $\alpha_3 > \alpha_2$ eliminates any influence by the supply portion and the blend portion on the final pressure, so that the stabilized thermoplastic foamed bodies may be produced without accompanying variation of extrusion pressure.

While the invention has been described in detail and with reference to specific embodiments thereof, it will be apparent to one skilled in the art that various changes and modifications can be made therein without departing from the spirit and scope thereof.

We claim:

1. An apparatus for producing foamed plastic insulated wires including an extruding machine comprising a supply portion, said supply portion having means for receiving under pressure a molten thermoplastic resin and a foaming agent, a blend portion positioned to receive said resin and said foaming agent from said supply portion for blending said resin and foaming agent, and a metering portion positioned to receive blended resin and foaming agent from said blend portion for metering said blended resin and foaming agent to deliver same to a cross head, said supply, blend and metering portions being sections of an extrusion cylinder and an extrusion screw, said portions having respective extrusion coefficients $\alpha_1$, $\alpha_2$ and $\alpha_3$ which are related to one another as follows:

$$\alpha_1 > \alpha_3 > \alpha_2$$

said extrusion coefficients being a function of screw contour and defining the volume extruded per revolution of the screw.

2. The apparatus of claim 1, wherein said screw in said blend portion is a mixing device having a plurality of grooves which have a helical angle to the downstream direction.

3. The apparatus of claim 1, wherein the screw in said supply portion is tapered to a deeper groove in the downstream direction of said apparatus.

4. The apparatus of claim 1, wherein the compression ratio is between 1.4 and 0.75 inclusive, said compression ratio being defined as the volume surrounded by one pitch of said screw in the metering portion divided by the volume surrounded by one pitch of said screw in the supply portion.

5. The apparatus of claim 4, wherein said compression ratio is between 1.3 and 0.95 inclusive.

6. The apparatus of claim 1, wherein said supply portion further comprises a foaming agent inlet and a resin inlet, said resin inlet being downstream of said foaming agent inlet.

7. The apparatus of claim 6, wherein said foaming agent inlet is separated from said resin inlet by a distance of from 2D to 7D, where D is the caliber of said screw in said supply portion, and wherein said resin inlet is separated from said blend portion by a distance of from 2D to 5D.

8. The apparatus of claim 7, wherein said blend portion has a length of from 2D to 7D.

9. The apparatus of claim 2, wherein said compression ratios have the relationships, $\alpha_1/\alpha_2$ is between 1.21 and 1.71 inclusive and $\alpha_3/\alpha_2$ is between 1.11 and 1.61 inclusive.

10. The apparatus of claim 2, wherein said compression ratios have the relationships, $\alpha_1/\alpha_2$ is between 1.45 and 1.60 inclusive, and $\alpha_3/\alpha_2$ is between 1.35 and 1.45 inclusive.

11. The apparatus of claim 2, wherein the compression ratios are related as follows, $$\alpha_2 : \alpha_3 : \alpha_1 = 1 : 1.42 : 1.52$$

12. The apparatus of claim 1, wherein said screw in said blend portion comprises a screw shaft reduced in diameter relative to the screw shaft in said supply portion and a plurality of posts implanted on said screw shaft.

13. The apparatus of claim 1, wherein said screw in said blend portion comprises a plurality of equally spaced spur gears carried by a screw shaft, each of said spur gears having an identical thickness but a different number of teeth.

14. The apparatus of claim 1, wherein said screw in said blend portion comprises a screw shaft having double threading relative to the screw shaft in said supply portion and a plurality of axial slots through the threading.

* * * * *